Dec. 1, 1970   G. H. TAINTER   3,544,182
KITCHEN CUTTING BOARD STORAGE UNIT
Filed Dec. 23, 1968
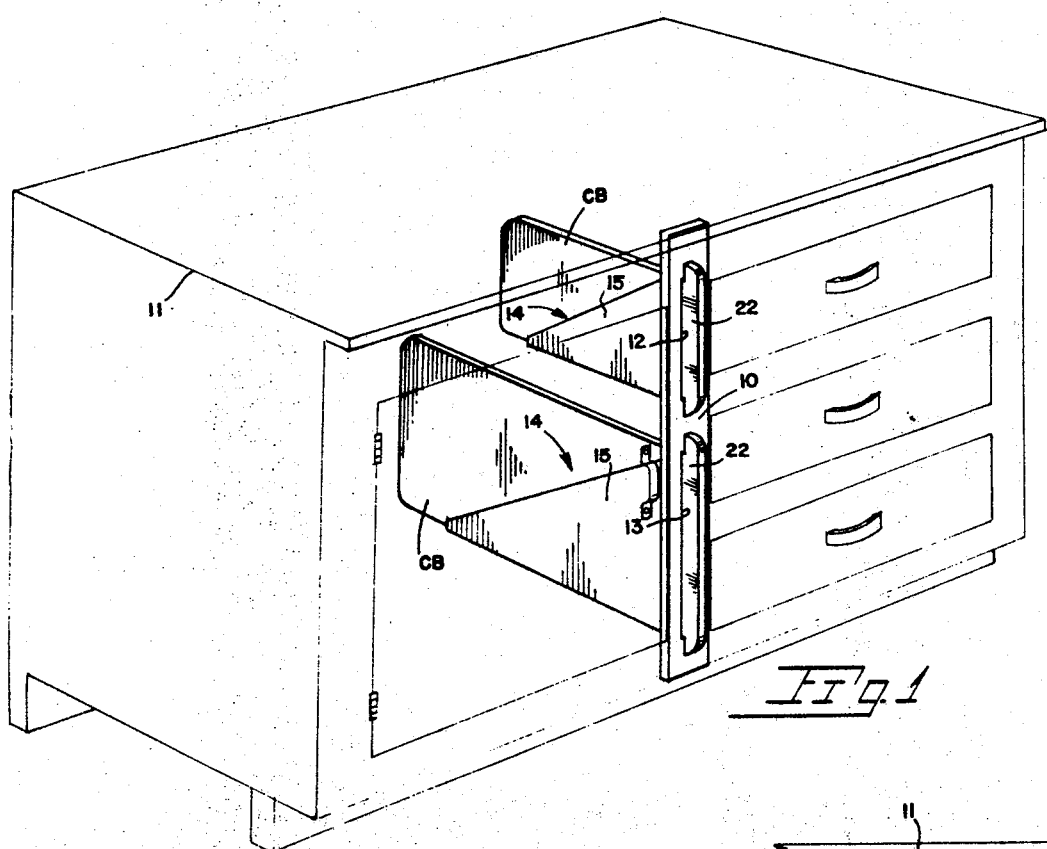
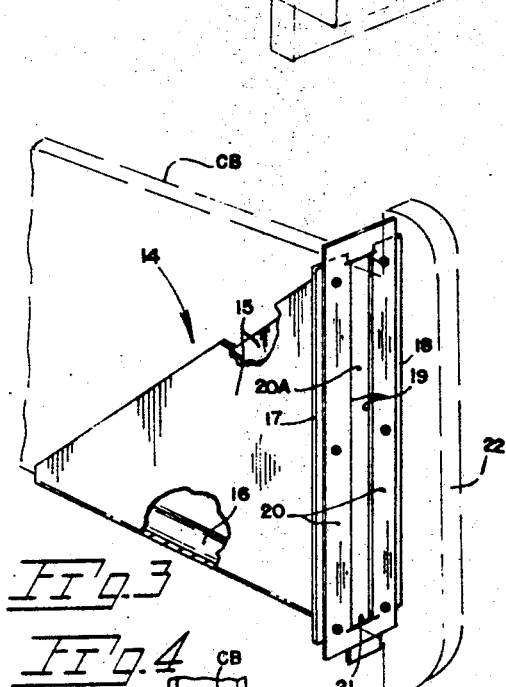
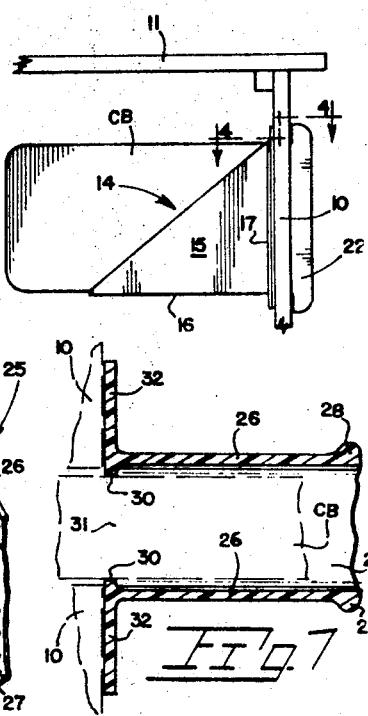
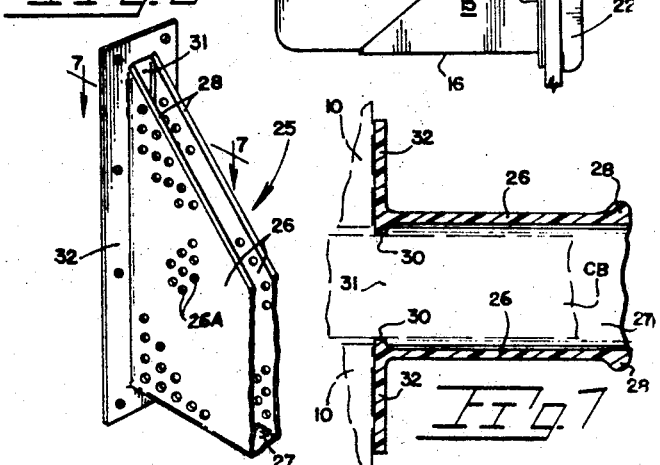
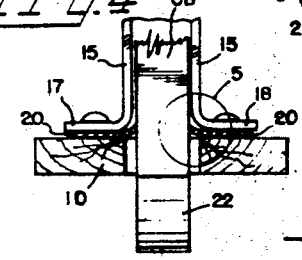
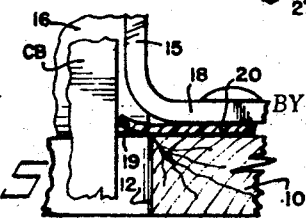
*INVENTOR.*
GREGORY H. TAINTER
BY
AGENT ём
United States Patent Office 3,544,182
Patented Dec. 1, 1970

3,544,182
KITCHEN CUTTING BOARD STORAGE UNIT
Gregory H. Tainter, P.O. Box 528,
Lakeview, Oreg. 97630
Filed Dec. 23, 1968, Ser. No. 785,926
Int. Cl. A47b 77/14
U.S. Cl. 312—237                                              5 Claims

ABSTRACT OF THE DISCLOSURE

A cutting board storage unit disposed within a kitchen cabinet for storage of cutting boards of the type used in culinary work. An upright space located between kitchen cabinet components is slotted to receive inserted cutting boards which are supported in a concealed manner by inwardly projecting board supports carried by the spaces. Wiping means contactable with cutting board surfaces for cleaning the same are also disclosed.

BACKGROUND OF THE INVENTION

The present invention relates generally to kitchen cabinet construction and more particularly to a cutting board storage unit incorporated therewithin.

Existing kitchen cabinet structures I am aware of make provision for a single cutting board or bread board horizontally and slidably supported within a rectangular slot-like opening immediately below the counter edge. The space below said counter edge extending downwardly to the first drawer or cabinet door is limited to permit the installation of but one cutting board which is usually used in place, i.e., extended with its rearward end being retained in the slot-like opening. Since only one board can be conveniently provided in such an installation the board is usually large in size not easily removed for optimum use on a counter top nor easily cleaned prior to replacement.

An important feature of this present invention is realized by the noval utilization of a cabinet spacer as part of a board storage unit. Cabinet spacers as known in the art are those unitary, vertically extending cabinet members which serve to space apart rows of drawers or drawers and cabinet doors. The present invention utilizes one of said spacers as a vertical support for cutting board storage units in which plural bread or cutting boards of convenient sizes are stored on edge in an upright manner. The space available desirably permits at least two different sized boards.

An advantage realized by such edgewise storage is the convenient provision of scraping means fully contactable with both sides of the cutting board to remove food or moisture particles during replacement of the board. The growth of bacteria in any food particles left on cutting boards is at a rapid rate and can, of course, be the source of contamination of food later placed on the board.

The ease with which the presently disclosed cutting boards may be removed from storage, used and replaced encourages their use which results in the preservation of decorative counter tops otherwise subjected to forceful blows or sharp instruments incident to kitchen tasks normally performed on cutting boards.

A modified board storage unit includes a board support of unitary construction formed with air passage openings to facilitate board drying to further inhibit bacterial growth on the board.

SUMMARY

The board storage unit provides for the upright storage of one or more removable cutting boards which may be removed for placement on a counter top preparatory to the cutting task being performed. Important to the present invention is the novel utilization of an upright spacer component of the cabinet structure as a base from which rearwardly project the board supports.

The supports may be associated with scraping means for removing food particles or moisture from the board surface as it is returned to its stored location. The scraping means may be in the form of a flexible member interposed between the support and the wooden spacer or provided as an integral part of a unitary board support.

DESCRIPTION OF THE DRAWINGS

In the accompanying drawings:
FIG. 1 is a perspective view of a cutting board storage unit in place within a cabinet, the latter shown in phantom lines,
FIG. 2 is a side elevational view of the upper portion of the unit shown in FIG. 1 with a counter top shown in full lines,
FIG. 3 is a perspective view of one form of board support with scraping means and shown removed from its supporting spacer member,
FIG. 4 is a sectional view taken downwardly along line 4—4 of FIG. 2,
FIG. 5 is an enlarged detail view of that portion of FIG. 4 encircled at 5,
FIG. 6 is a fragmentary, perspective view of a one-piece board support removed from its supporting spacer member, and
FIG. 7 is an enlarged sectional view taken along line 7—7 of FIG. 6 with fragments of the spacer member and cutting board being shown in broken lines.

DESCRIPTION OF PREFERRED EMBODIMENTS

With continuing reference to the drawings wherein like reference numerals indicate parts similarly identified in the following specification, the reference number 10 indicates a spacer member of a cutting board storage unit. The cabinet structure 11 shown in phantom lines is intended as being typical of that found in household kitchens wherein spacers are conventionally installed to horizontally space apart sets of drawers or cabinet doors or various combinations thereof. Such spacers 10 are approximately three inches in width and extend from upward abutment with the counter top downwardly the vertical distance of the cabinet's front wall. While the spacer shown is of rectangular shape in front elevation it may be of other shapes, it being necessary only to provide a vertically disposed spacer area to which the later described board support may be applied.

In the embodiment shown in FIG. 1 vertically aligned elongate openings 12 and 13 are formed in the spacer 10, the dimensions of said openings being approximately the sectional dimensions of the cutting boards at CB to be received.

Applied to what will eventually be the backside of the spacer member 10 are the cutting board supports, one form of which is indicated generally at 14 and includes a formed sheet metal structure having closely spaced parallel walls 15 of triangular shape. The support walls 15 extend rearwardly a distance to support each board in perpendicular relationship to the spacer member. When formed in the preferred manner from a single piece of sheet material, a web 16 (FIG. 3) is provided extending intermediate the lower edges of walls 15 and upon which web will rest the cutting board. The walls may be perforated as later described in connection with the second form of the invention. Further for rigidity the upper edges of each wall 15 may be folded back on itself along its inclined edge.

The support 14 terminates forwardly in outwardly turned flanged portions 17 and 18 which receive spacer attachment means such as common wood screws. Affixed to the front side of the flanged portions 17 and 18 is a wiper 20 in the form of a flexible piece of material preferably a durable plastic material and being of semi-rigid nature to effect a scraping action on both upright surfaces of the cutting board.

For convenient installation of each board support 14 the wiper 20 is spotted in place on the flanges 17 and 18 with a suitable adhesive with its rectangular opening 20A symmetrically disposed slightly inward of the edges of the openings 12 or 13 in the wooden spacer member 10. The width of opening 20A is slightly less than the thickness of the cutting board CB whereby insertion of the board results in a slight flexing of unsupported wiper edges at 19 which define opening 20A as best seen in FIG. 5. The length of the slot 20A is such as to permit passage of the cutter board with the lower end 21 of the wiper 20 being coplanar with the web 16 and with the lower edge of the spacer opening 12 or 13 to permit easy removal from said opening of loose food particles scraped from the board.

With regard to the cutting boards CB such may be of standard configuration including an enlarged hand hold portion 22 which serves also as a limit stop. To avoid projecting outwardly an objectionable distance the hand hold 22 may be reduced so as to extend no further outwardly than would drawer pulls or handles on adjacent cabinet structure.

With attention now being directed to the form of the invention disclosed in FIGS. 6 and 7 a unitary molded board support is indicated generally at 25. In this form of the invention the wiper means is formed integral within the board support itself by simply providing a scraping edge thereon.

The modified board support 25 includes parallel walls 26 again of triangular shape and interconnected along the common lower edges by a web 27 the latter supporting the board when stored in place. A bead 28 is provided along the inclined edges of the walls to add rigidity to same to insure an airspace between the walls and the cutter board.

To promote drying of a board the walls 26 may be perforated at 26A or other open construction to admit an airflow over the board surfaces.

The wiper means embodied in the second form of the invention comprises a pair of inwardly directed projections 30 which define the vertical edges of a board receiving opening 31. Said projections serve the same purpose as the wiper edges 19 of the invention's first form but, in distinction thereto, are preferably rigid. The distance between said edges is the same as the thickness of the cutter board to result in sliding contact of each projection 30 with the board surface. The food particles so scraped from the board surface fall to the lower end of the opening in the cabinet spacer for convenient removal.

For mounting of the board support 25 to the backside of a spacer member 10 an outwardly directed mounting flange 32 is formed integral with the walls 26 and the web 27. As with the first form of the invention the board support 25 and specifically the projections 30 are symmetrically disposed slightly inward of the edges of the opening cut in the spacer 10 as shown in FIG. 7.

What I claim is:
1. A cutting board storage unit comprising:
   an elongate spacer member for incorporation into cabinet structure in a vertically disposed manner and defining at least one opening lengthwise orientated in said member,
   a cutting board support affixed to the rearward side of said spacer for concealment within said cabinet structure and including a pair of spaced apart wall members and an interconnecting web for supporting contact with said cutting board, an outwardly directed flanged portion integral with said wall members for mounted engagement with said board support on said spacer.
2. The invention as claimed in claim 1 wherein said board support includes wiping means, said means disposed for passing surface contact with both sides of the cutting board as the latter is moved to a stored position intermediate said wall members.
3. The invention as claimed in claim 2 wherein said wiping means comprises flexible sheet material, said material having an opening therein defined by inner edges and corresponding substantially in size to the sectional dimensions of a cutting board insertable therewith with said inner edges disposed for scraping contact with a passing board.
4. The invention as claimed in claim 2 wherein said wiping means is embodied within inwardly directed projections integrally formed with said outwardly directed flanged portions.
5. The invention as claimed in claim 1 wherein said wall members are of perforated construction.

References Cited
UNITED STATES PATENTS

| 498,974 | 6/1893 | Harkinson | 312—237 |
|---|---|---|---|
| 2,760,839 | 8/1956 | Martin | 312—10 |
| 3,146,041 | 8/1964 | Lambert | 312—10 |

REINALDO P. MACHADO, Primary Examiner

U.S. Cl. X.R.

312—330